(12) United States Patent  
Manglik et al.

(10) Patent No.: US 9,661,071 B2  
(45) Date of Patent: May 23, 2017

(54) APPARATUS, SYSTEMS AND METHODS FOR DEPLOYMENT AND MANAGEMENT OF DISTRIBUTED COMPUTING SYSTEMS AND APPLICATIONS

(71) Applicant: Cliqr Technologies, Inc., San Jose, CA (US)

(72) Inventors: Gaurav Manglik, Mountian View, CA (US); Tianying Fu, San Jose, CA (US)

(73) Assignee: CLIQR TECHNOLOGIES, INC., San Jose, CA (US)

( * ) Notice: Subject to any disclaimer, the term of this patent is extended or adjusted under 35 U.S.C. 154(b) by 9 days.

(21) Appl. No.: 15/013,701

(22) Filed: Feb. 2, 2016

(65) Prior Publication Data

US 2016/0156707 A1    Jun. 2, 2016

Related U.S. Application Data

(63) Continuation of application No. 14/497,196, filed on Sep. 25, 2014, which is a continuation of application No. 13/024,302, filed on Feb. 9, 2011, now Pat. No. 8,862,933.

(51) Int. Cl.
*H04L 12/761* (2013.01)
*H04L 29/08* (2006.01)
*G06F 9/50* (2006.01)

(52) U.S. Cl.
CPC ........ *H04L 67/1014* (2013.01); *G06F 9/5072* (2013.01); *H04L 67/1097* (2013.01); *H04L 67/2823* (2013.01)

(58) Field of Classification Search
None
See application file for complete search history.

(56) References Cited

U.S. PATENT DOCUMENTS

| | | |
|---|---|---|
| 6,718,535 B1 | 4/2004 | Underwood |
| 7,028,218 B2 | 4/2006 | Schwarm et al. |
| 7,523,190 B1 | 4/2009 | Bickerstaff et al. |
| 7,809,975 B2 | 10/2010 | French et al. |
| 7,849,350 B2 | 12/2010 | French et al. |
| 7,853,767 B2 | 12/2010 | Maki et al. |
| 8,090,979 B2 | 1/2012 | Watanabe et al. |

(Continued)

OTHER PUBLICATIONS

"Third-Party Submission under 37 CFR 1.290 Concise Description of Relevance," filed in U.S. Appl. No. 14/497,196, filed Feb. 18, 2015.

*Primary Examiner* — Fan Ng
(74) *Attorney, Agent, or Firm* — Venkatesh Krishnamoorthy; Silicon Valley Patent Group LLP

(57) ABSTRACT

Embodiments of apparatus, systems and methods facilitate the running a distributed computing application on at least one of a plurality of cloud infrastructures. In some embodiments, the processor implemented method comprises: deriving an infrastructure independent representation of the distributed computing application; and running the distributed computing application on one of a plurality of cloud infrastructures by utilizing a cloud-specific implementation of the infrastructure independent representation of the distributed computing application. The cloud-specific implementation of the infrastructure independent representation corresponds to the cloud infrastructure on which the distributed application is run.

24 Claims, 10 Drawing Sheets

(56) References Cited

U.S. PATENT DOCUMENTS

| | | |
|---|---|---|
| 8,176,208 B2 | 5/2012 | Shishido et al. |
| 8,250,215 B2 | 8/2012 | Stienhans et al. |
| 8,386,839 B2 | 2/2013 | Watanabe et al. |
| 8,489,918 B2 | 7/2013 | Watanabe et al. |
| 8,904,005 B2 | 12/2014 | Ferris et al. |
| 2002/0013895 A1 | 1/2002 | Kelley et al. |
| 2002/0120741 A1* | 8/2002 | Webb ................ G06F 11/3093 709/225 |
| 2004/0098458 A1 | 5/2004 | Husain et al. |
| 2007/0083650 A1 | 4/2007 | Collomb et al. |
| 2007/0260702 A1 | 11/2007 | Richardson et al. |
| 2009/0216975 A1 | 8/2009 | Halperin et al. |
| 2009/0300151 A1 | 12/2009 | Friedman et al. |
| 2010/0042720 A1 | 2/2010 | Stienhans et al. |
| 2010/0061250 A1 | 3/2010 | Nugent |
| 2010/0070319 A1 | 3/2010 | Prafullchandra et al. |
| 2010/0088150 A1 | 4/2010 | Mazhar et al. |
| 2010/0125476 A1 | 5/2010 | Yeom et al. |
| 2010/0125844 A1 | 5/2010 | Mousseau et al. |
| 2010/0191796 A1 | 7/2010 | Almeida et al. |
| 2010/0228819 A1 | 9/2010 | Wei |
| 2010/0235830 A1 | 9/2010 | Shukla et al. |
| 2011/0185292 A1 | 7/2011 | Chawla et al. |
| 2011/0320821 A1 | 12/2011 | Alkhatib et al. |
| 2012/0131591 A1 | 5/2012 | Moorthi et al. |
| 2012/0158803 A1 | 6/2012 | Kandasamy et al. |
| 2012/0159459 A1* | 6/2012 | Turner .................... G06F 8/314 717/138 |
| 2012/0179820 A1 | 7/2012 | Ringdahl et al. |
| 2012/0203823 A1 | 8/2012 | Manglik et al. |
| 2012/0239739 A1 | 9/2012 | Manglik et al. |
| 2012/0254966 A1 | 10/2012 | Parker |
| 2012/0331528 A1 | 12/2012 | Fu et al. |
| 2013/0151598 A1 | 6/2013 | Fu et al. |
| 2014/0040656 A1 | 2/2014 | Ho et al. |
| 2015/0039770 A1 | 2/2015 | Manglik et al. |
| 2015/0121078 A1 | 4/2015 | Fu et al. |

* cited by examiner

SHARED-STORAGE

440

- 442 — Name: Shared Storage
- 444 — Description: Shared Storage
- 445 — Version: 1.0
- 446 — Dependencies: NONE
- 448 — Model-Inputs: NONE
- 450 — Run-Inputs: NONE
- 452 — Characteristic Inputs: Max Storage, Min Storage
- 454 — Implementations:
  - 456 — Cloud: Amazon, Implementation: AmazonDFS
  - Cloud: RackSpace, Implementation: RackspaceSAN

FIG. 4C

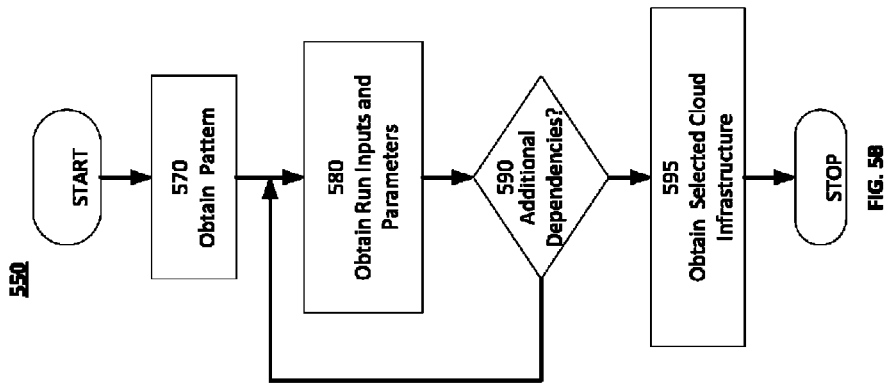
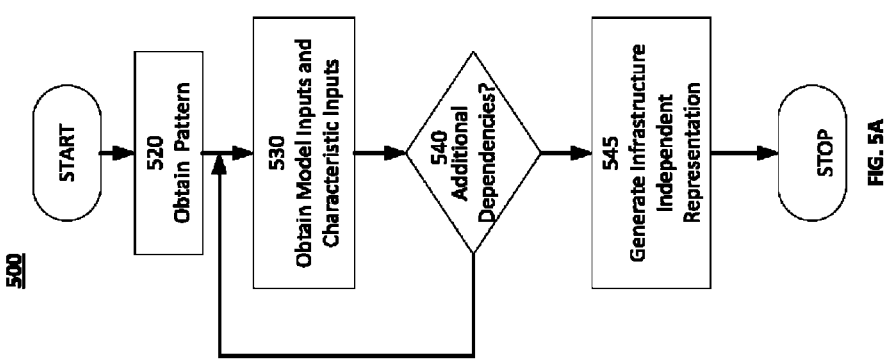

ND MANAGEMENT
APPARATUS, SYSTEMS AND METHODS FOR DEPLOYMENT AND MANAGEMENT OF DISTRIBUTED COMPUTING SYSTEMS AND APPLICATIONS

CROSS REFERENCE TO RELATED APPLICATIONS

This application is a continuation of U.S. patent application Ser. No. 14/497,196 entitled "Apparatus, Systems, and Methods for Deployment and Management of Distributed Computing Systems and Applications," filed Sep. 25, 2014, which, is a continuation of U.S. patent application Ser. No. 13/024,302 (now U.S. Pat. No. 8,862,933) entitled "Apparatus, Systems, and Methods for Deployment and Management of Distributed Computing Systems and Applications," filed Feb. 9, 2011. Both of the above applications are assigned to the assignee hereof and are incorporated by reference in their entireties herein for all purposes.

BACKGROUND

Field of the Invention

The present invention relates to the field of distributed computing and in particular, to apparatus, systems, and methods to facilitate the deployment and management of distributed computing systems and applications.

Description of Related Art

The performance of computing applications may often be increased by distributing the computational workload across nodes in a cluster of computers. For example, the performance of compute intensive applications such as DNA sequencing, financial modeling, weather simulations, electronic design automation, etc. can be significantly improved by distributing the applications across nodes in computing clusters. Similarly, by distributing web applications over a computing cluster performance of the application may be enhanced by decreasing latency and/or increasing throughput. Most applications today, including the examples mentioned above, are designed and programmed to be distributed over a cluster of computers. Indeed, a vast majority of organizations such as corporations, academic departments, and research centers use computing clusters for both mission critical applications and for a variety of other functions that arise in the course of normal business operations. Because applications that utilize an organizations private cluster may be run infrequently, the utilization of such clusters may be less than ideal. In addition, there are significant costs associated with the provisioning and maintenance of large computing clusters. Moreover, for a given private cluster and application there is an upper threshold on the scalability of the application because increasing the capacity of the cluster may involve the physical addition of hardware and other resources to the cluster. The evolution of "Cloud computing services" or "public clouds", which provide on-demand access to high performance computing capabilities over the Internet, is an attempt to increase efficiencies and scalability, while reducing the costs associated with large computing clusters.

"Cloud computing" can refer to the use of a company's own computer cluster, but more often the term refers to the use of publicly available computing resources over the Internet through Web browser-based or client-side applications. The cloud infrastructures are typically made available on an on-demand basis. Cloud computing enables organizations to run applications on reliable, highly-available, and scalable software and hardware infrastructures referred to as clouds. Clouds may use virtualization or sophisticated systems management solutions to provide a flexible, fault tolerant, and highly available view of underlying resources so that dedicated hardware resources can be dynamically shared across several users instead of being assigned individually. These computing resources, which are often made available as virtual machines (and in some instances as physical machines), may be accessed using Application Programming Interfaces ("APIs") and self-service portals—such as websites accessed using a web browser. Cloud infrastructure, which is offered by companies such as Amazon™ EC2, Terremark™, Rackspace™, and Savvis™, refers to the provision of Infrastructure as a Service (IaaS) and permits fee-based on-demand access to the power of computing clusters and datacenters over the Internet. In some instances, organizations may use virtualization and convert their private data-centers into clouds as well. These are termed private clouds. As used herein, the term cloud can refer to both public and private clouds, which can be set-up as virtualized or physical compute clusters.

One drawback of current cloud computing systems is that they continue to present an infrastructure view of the resources so that end users manage cloud-dependent machines with varying storage, network, memory, and compute capabilities. For example, cloud providers may use very different APIs to present resources and the underlying capabilities of the cloud computing infrastructure to users. Consequently, complicated software systems may be even harder to manage on clouds than on private datacenters because (i) the infrastructure may be very different from a configuration under one's private control (ii) the cloud infrastructure varies with provider and, (iii) each cloud provider has very different APIs to access, provision, and scale resources. For example, shared storage may be provided in different ways on different clouds. Amazon™ for e.g.; has https based shared storage called Amazon™ S3, while on Rackspace™, one can utilize Network Attached Storage/System Area Network ("NAS/SAN") hardware to get shared storage. These differences in hardware and distributed systems capabilities creep into the virtualization abstraction, so that porting and migrating existing applications to cloud infrastructures can involve significant re-coding, re-architecting, and revision of systems management, security and compliance features. Therefore, there is a need for apparatus, systems, and methods that facilitate the quick, seamless, and transparent porting and migration of existing applications to a variety of cloud infrastructures, including hybrid public/private infrastructures.

SUMMARY

Consistent with embodiments disclosed herein, apparatus, systems and methods for the deployment and management of distributed computing systems and applications are presented. In some embodiments, a method for running a distributed computing application on at least one of a plurality of cloud infrastructures may comprise: deriving an infrastructure independent representation of the distributed computing application; and running the distributed computing application on the at least one cloud infrastructure by utilizing at least one cloud-specific implementation of the infrastructure independent representation of the distributed computing application, and wherein the at least one cloud-specific implementation corresponds to the at least one cloud infrastructure.

Embodiments also relate to software, firmware, and program instructions created, stored, accessed, or modified by processors using computer-readable media or computer-readable memory. The methods described may be performed on computers including distributed computing systems such as clouds.

These and other embodiments are further explained below with respect to the following figures.

BRIEF DESCRIPTION OF THE DRAWINGS

FIG. 4C shows an exemplary specification for the "SHARED-STORAGE" primitive.

FIG. 5A shows a flowchart of an exemplary algorithm to obtain inputs for the modeling of applications based on system and pattern primitives.

FIG. 5B shows a flowchart of an exemplary algorithm to obtain inputs for the deployment and execution of applications using system and pattern primitives.

DETAILED DESCRIPTION

In accordance with embodiments disclosed herein, apparatus, systems and methods for the deployment and management of distributed computing systems and are presented.

Figure 1:
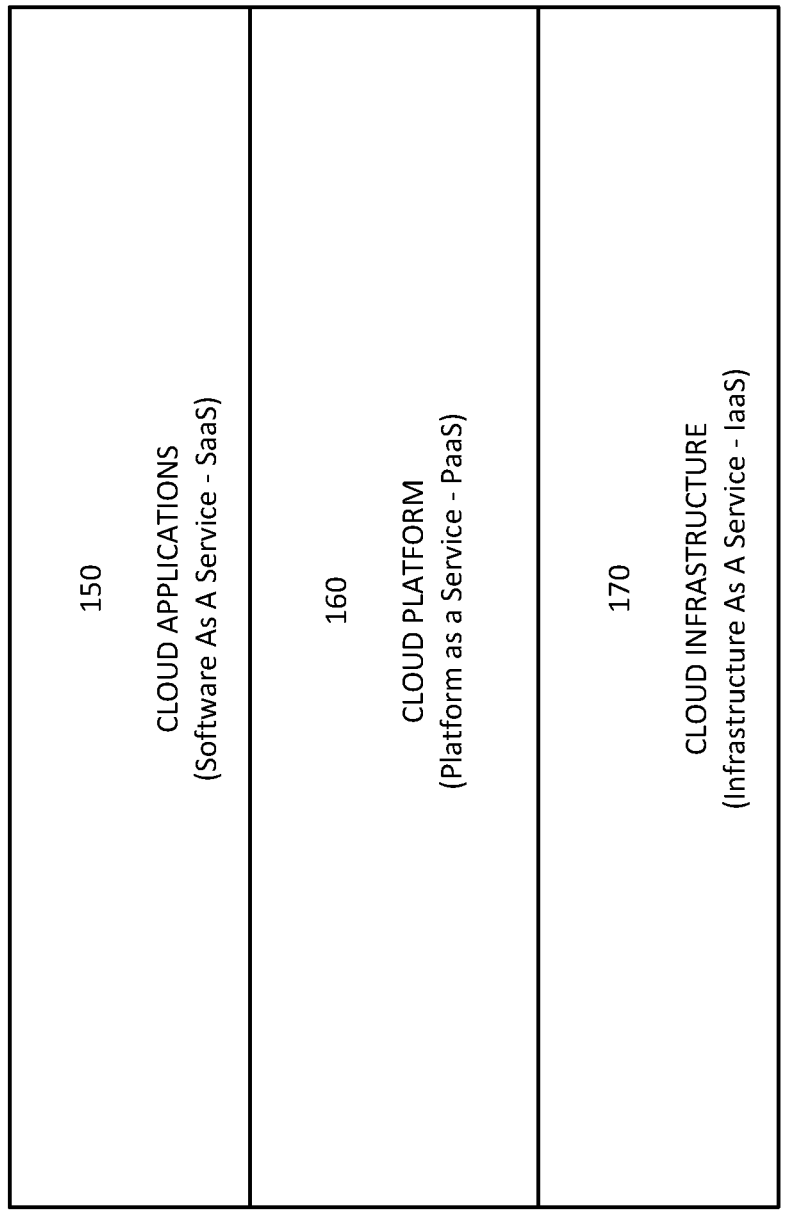
FIG. 1 illustrates the typical systems architecture of the software systems involved in the delivery of cloud computing.

FIG. 1 illustrates the typical systems architecture 100 of the software systems involved in the delivery of cloud computing. As shown in FIG. 1, system architecture 100 includes cloud infrastructure layer 170. Cloud platform layer 160, which is built on top of cloud infrastructure layer 170, can facilitate the development of applications to run on a platform provider's infrastructure. Typically, Cloud infrastructure layer 170 can provide virtualized servers that may be provisioned dynamically on-demand. Other infrastructure components like hardware load balancing, security, and storage can exist within cloud infrastructure layer 170. Because the layer permits dynamic on-demand access to cloud computing infrastructure, the functionality it provides is also referred to as Infrastructure as a Service ("IaaS").

Cloud platform layer 160 allows developers to build applications to run on a platform provider's infrastructure, which can free developers from concerns about environment configuration and infrastructure scaling. Typically, the service delivery model allows the customer to rent a "platform", which may include virtualized servers along with associated services that provide an integrated environment for one or more of development, testing, deployment, hosting, maintenance, and running of applications. The functionality provided by the cloud platform layer is also termed Platform as a Service ("PaaS"). Finally, Cloud application layer 150 is where applications run. These applications may include those that offer web-based software as a service ("SaaS").

Figure 2:
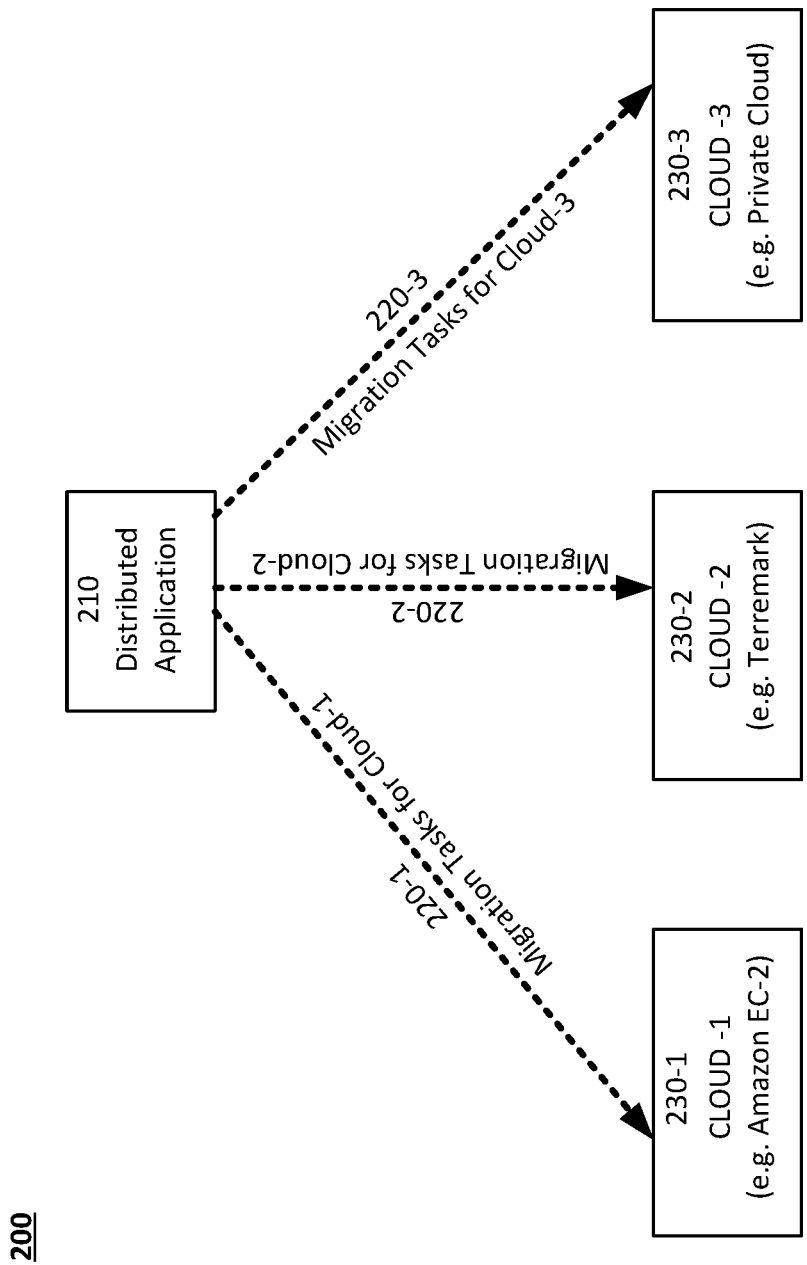
FIG. 2 shows a block diagram illustrating the conventional process of migrating applications to clouds.

FIG. 2 shows a block diagram 200 illustrating the conventional process of migrating applications to cloud infrastructures. Typically, current solutions for cloud migration for an application either involve a dedicated "Do It Yourself" (DIY) effort to migrate the application directly, or effort directed to port the application to use an appropriate Platform as a Service (PaaS) solution directed to the target cloud infrastructure.

In the DIY method significant work may be needed to re-code and re-architect existing applications, create virtual image deployments, and implement a management layer to provision, configure and manage those images in the target cloud environment. Because distributed systems require orchestration between several components that can be part of different images, migrating applications between clouds may involve complicated deployment and management procedures.

Using an appropriate PaaS may help reduce the complexity of the migration task. However, available PaaS' are also specific to a given style of computing and application and technology stack. For example, Heroku™ is a PaaS cloud that takes applications written in the Ruby language and deploys them to Amazon™ EC2. Heroku™ maintains appropriate Amazon™ Machine Images ("AMIs") (that are needed for running Ruby applications on Amazon™ and a management layer to provision and scale such applications. However, Heroku™ suffers from the limitations similar to the DIY methodology because its custom-built Amazon™ specific library of virtual machine images can be only used on Amazon™ for Ruby applications.

As shown in FIG. 2, cloud infrastructure Cloud-1 230-1 may be Amazon™ EC-2, while cloud infrastructure Cloud-2 230-2 may be Terremark™, and cloud infrastructure Cloud-3 230-3 may be a private cloud. The conventional process of migrating applications 210 to cloud infrastructures 230-1, 230-2, and/or 230-3 typically involves significant effort in the form of migration tasks 220-1, 220-2, and 220-3, respectively. As explained above, migration tasks 220-1, 220-2, and 220-3 to port application 210-1 may involve: (a) Recoding and re-architecting distributed application to fit cloud infrastructure; (b) Creating Virtual Machine Images for distributed application on that cloud (c) Coding a deployment and management layer to provision, configure and scale application deployment on the cloud; and (d) Implementing additional management features such as security and compliance.

Figure 3:
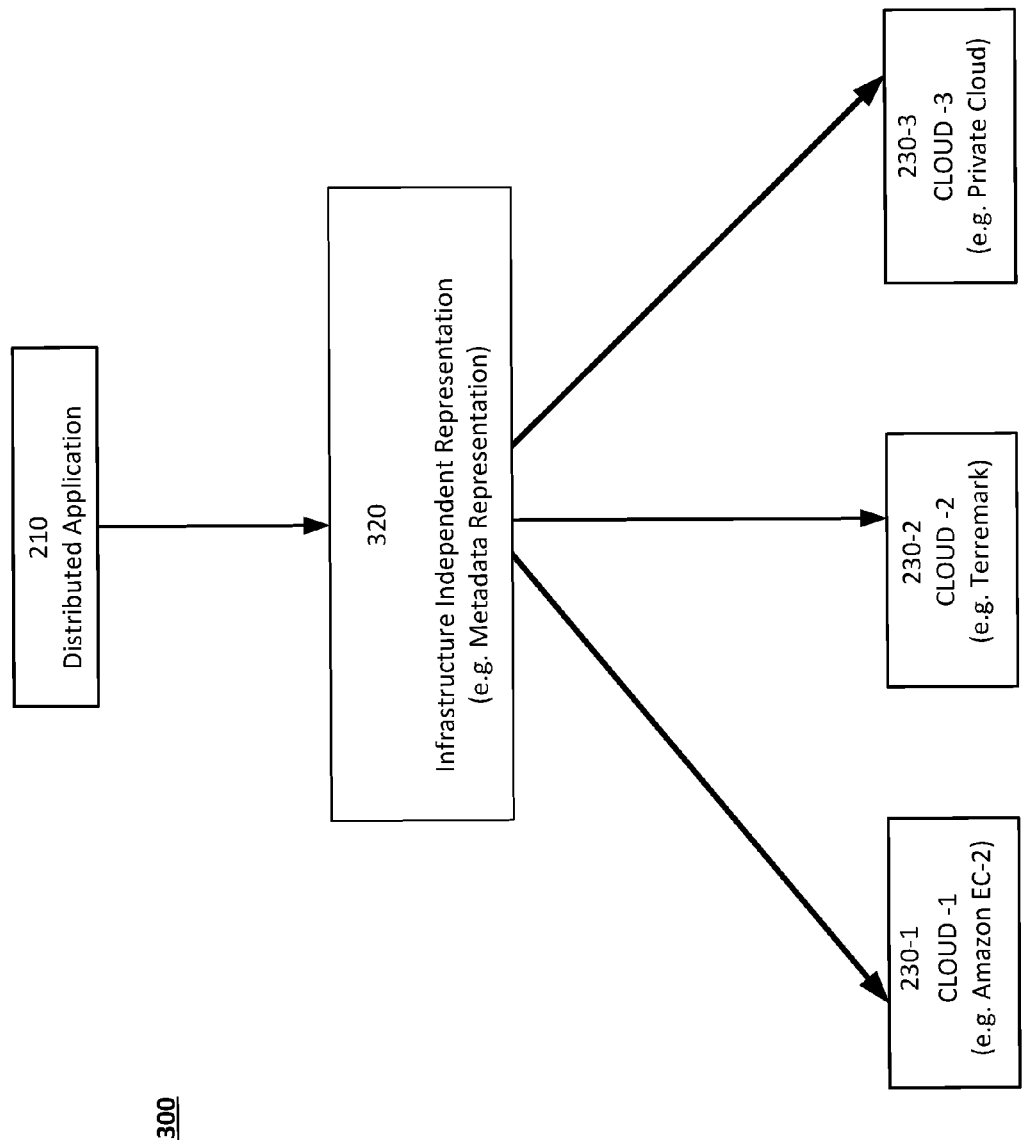
FIG. 3 shows an exemplary block diagram illustrating an exemplary workflow consistent with embodiments disclosed herein for deploying and/or migrating applications to distributed systems, including clouds.

FIG. 3 shows an exemplary block diagram 300 illustrating an exemplary workflow consistent with embodiments disclosed herein for deploying and/or migrating applications to distributed systems, including clouds. Although distributed applications are often designed for a given infrastructure, a consistent pattern of utilization of distributed systems and resources underlies the applications. Capturing these patterns of utilization and providing appropriate translation mechanisms that permit utilization the underlying cloud's APIs and resources can facilitate the migration and deployment of an existing application to multiple cloud infrastructures, including hybrid infrastructures. Representations of the underlying patterns of utilization of distributed system resources are termed "infrastructure independent representations".

In some embodiments, infrastructure independent representation 320 may be obtained based on characteristics and/or attributes associated with distributed application 210. For example, a metadata representation of distributed application 210 may be used as infrastructure independent representation 320. In some embodiments, infrastructure independent representation 320 may be obtained without recoding or re-architecting distributed application 210.

For example, infrastructure independent representation 320 may be obtained based on a contract or behavior associated with the applications that guarantees successful execution. In general, distributed systems may be modeled by in terms of constructs that capture these contracts or behaviors. Constructs can include "system constructs", which pertain to a manner of utilizing resources (e.g. compute resources, storage, memory and/or network) and "pattern constructs," which pertain to the mechanics, framework, or paradigm governing the interaction of systems in performing a computational task (e.g. master-slave, map-reduce, message passing, stateless applications). In some embodiments, infrastructure independent representation 320 may be obtained by using the contract or behavior associated with distributed application 210 to remove infrastructure dependent details from system and pattern constructs in a manner that is independent of the underlying implementation of that construct.

For example, from the perspective of distributed application 210, shared storage is a distributed system that adheres to the contract that bits stored in the system are consistently available to individual nodes in the computing cluster. Shared storage may be implemented by many available systems, such as, Network File System ("NFS") over NAS/SAN, Cluster File System, Distributed File System ("DFS") or https based remote storage such as Amazon™ S3. In addition, the shared storage used by distributed application 210 may have various associated characteristics such as one or more of security, high-availability and/or redundancy constraints, minimum read and write performance, etc. Although, the eventual implementation of the shared storage may be infrastructure dependent, infrastructure independent representation 320 can include a description of the shared storage in terms of the contract and characteristics associated with the storage.

In some embodiments, seamless transparent migration and deployment of distributed application 210 to various cloud infrastructures may be facilitated by using the infrastructure independent representation 320 to obtain corresponding infrastructure-dependent implementations, such as shared storage implementations for the respective cloud infrastructures. Cloud infrastructures include, but are not limited to, public cloud infrastructures such as Amazon™ RackSpace™, Terremark™, Microsoft™ Azure, and Savvis™, and/or private clouds that may be built using products such as VMware™ vCloud, Nimbula™, OpenStack or over plain linux clusters. For example, the shared storage information in infrastructure independent representation 320 may be used to obtain an appropriate shared storage implementation with the appropriate specified characteristics, such as DFS for Amazon™, NAS/SAN for Terremark™, etc.

In some embodiments, code libraries on the various clouds may be used to obtain infrastructure dependent implementations from infrastructure independent representation 320. Accordingly, implementations of distributed application 210 may be automatically realized and deployed on cloud infrastructures Cloud-1 230-1, Cloud-2 230-2, and/or Cloud-3 230-3 based on information infrastructure independent representation 320. As shown in FIG. 3, cloud infrastructure Cloud-1 230-1 may be Amazon™ EC-2, while cloud infrastructure Cloud-2 230-2 may be Terremark™, and cloud infrastructure Cloud-3 230-3 may be a private cloud. In some embodiments, infrastructure independent representation 320 may be generated by using language primitives in an appropriate programming or description language, which in some instances, may be a proprietary language.

In some embodiments, the primitives used may be based on the system and pattern constructs used to models distributed systems. For example, System Primitives may include commands or instructions that facilitate the "launching of cluster with n nodes" on one or more clouds. Cloud-specific implementations of "launching of cluster with n nodes" may be used to implement the primitive. As another example, system primitives may also include commands or instructions that facilitate the "launching of shared storage," wherein the underlying implementation of the primitive (on individual clouds) can be a cloud specific.

Pattern Primitives may include commands or instructions such as "parallel pattern," which may be used to run an application command or a series of commands on n compute nodes with shared storage in parallel. The "parallel pattern" primitive describes the simple execution of commands simultaneously on cluster nodes. Another example of a pattern primitive is "batch execution pattern," which may be used to run a number "t" of tasks placed on a queue on a number "n" of compute nodes. The "batch execution pattern" primitive example above can describe an execution pattern that utilizes shared storage, a queue and master-slave compute nodes. Pattern primitives may be used to orchestrate the set up of underlying distributed systems during application deployment.

Figure 4A:
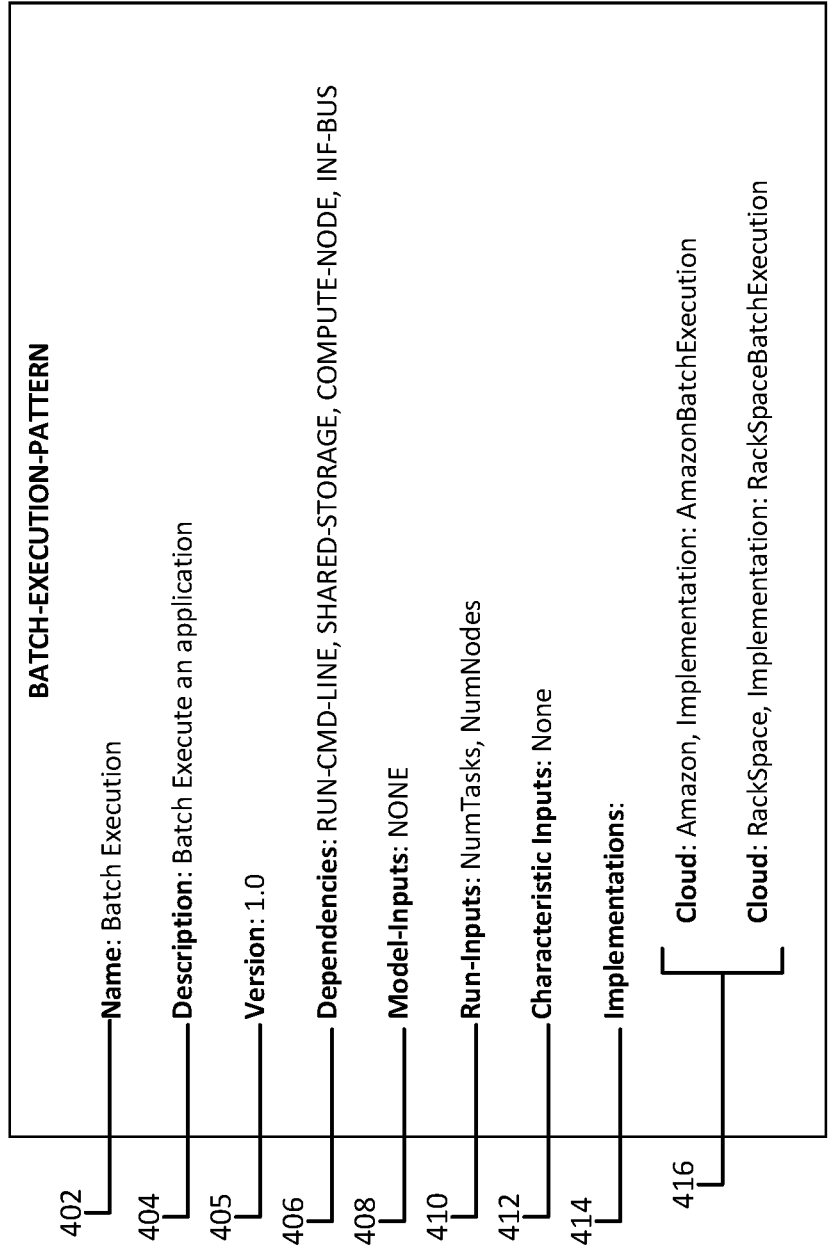
FIG. 4A shows an exemplary specification for a batch execution pattern primitive.

FIG. 4A shows an exemplary specification 400 for a batch execution pattern primitive. As shown in FIG. 4, batch execution pattern primitive specification 400 includes information such as: name of the primitive—Name 402 (Batch Execution), a description of the primitive's function or utility—Description 404 (Batch Execute an application), version or revision number Version—405, and any dependencies or interrelationships with other primitives—Dependencies 406. As shown in FIG. 4A, batch execution pattern primitive specification 400 lists Dependencies 406 as RUN-CMD-LINE, SHARED-STORAGE, COMPUTE-NODE, INF-BUS.

Additionally, as shown in FIG. 4A, batch execution pattern primitive specification 400 further includes information such as inputs at modeling time—Model Inputs 408 (None), inputs utilized at deployment/execution time (at the time of application deployment/execution)—Run Inputs 410, and application characteristics—Characteristic Inputs 412 (None). Batch execution pattern primitive specification 400 lists Run Inputs 410 as NumTasks, NumNodes, which indicates that the Number of Tasks and the Number of Nodes to be utilized are input at run time.

Batch execution pattern primitive specification 400 also includes a listing of implementations of the primitive on various clouds—Implementations 414 which lists the clouds (Amazon™, Rackspace™) under Cloud 416 on which the primitive has been implemented. In some embodiments, a library of implementations for primitives is maintained for one or more clouds. Implementations of the primitive may include metadata and code. For example, the metadata portion of a primitive implementation on a cloud may include: (i) a reference to the primitive for which this is the implementation and (ii) a reference to the cloud type for which this implementation has been made, and/or (iii)

concrete values for characteristics that this implementation can meet. The code portion may include details pertaining to the specific implementation represented by an execute method that has the appropriate logic to launch or execute the primitive on the cloud. In one embodiment, for an Object Oriented implementation, primitives may be represented by interfaces or XML metadata, while implementations can be concrete classes with execute methods. As shown in FIG. 4A, Cloud 416 lists the specific execute methods for Amazon™ and Rackspace™ as AmazonBatchExecution and RackspaceBatchExecution, respectively.

Figure 4B:
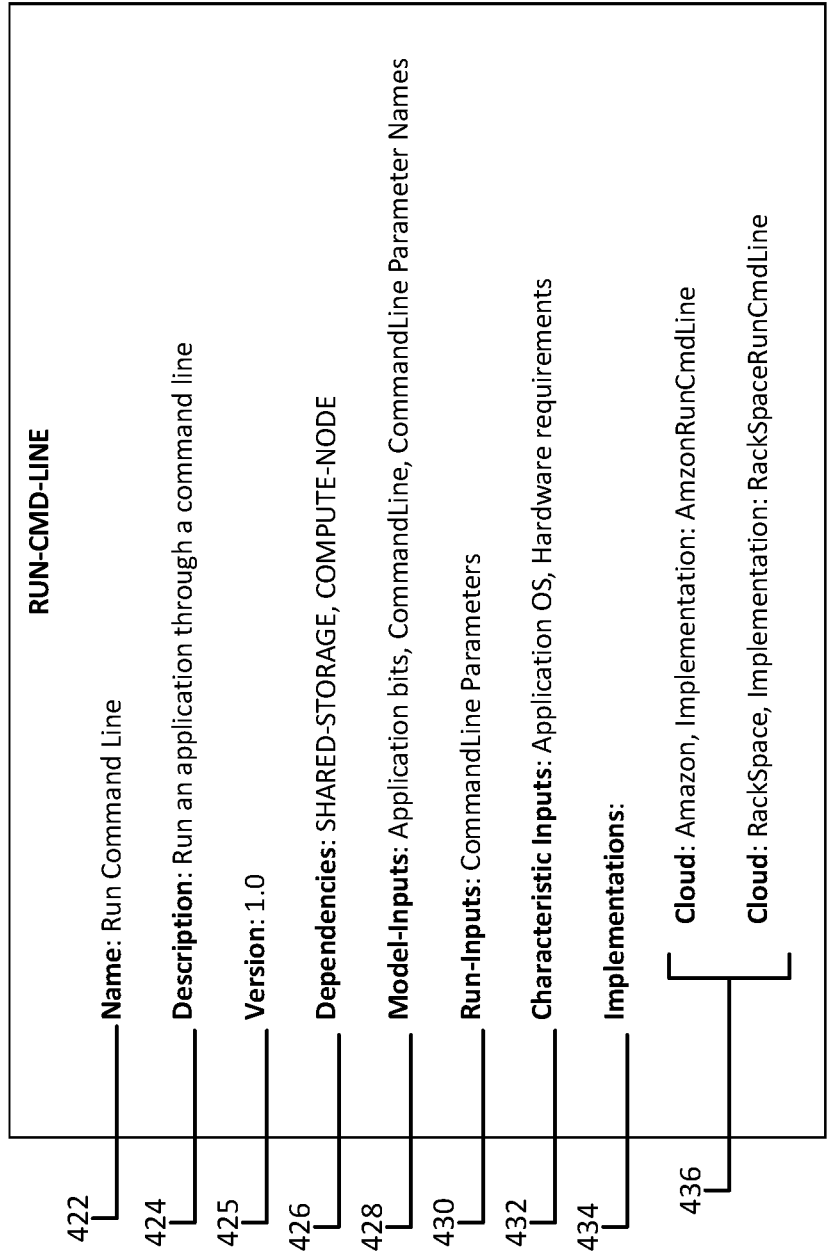
FIG. 4B shows an exemplary specification for the "RUN-CMD-LINE" primitive.

FIG. 4B shows an exemplary specification for the "RUN-CMD-LINE" primitive 420 listed in Dependencies 406 in batch execution pattern primitive 400. RUN-CMD-LINE primitive specification 420 includes information such as: name of the primitive—Name 422 ("Run Command Line"), a description of the primitive's function or utility—Description 424 ("Run an application through the command line"), version or revision number Version—425, any dependencies or interrelationships with other primitives—Dependencies 426, and inputs utilized at modeling time 428. As shown in FIG. 4B, RUN-CMD-LINE primitive specification 420 lists Dependencies 426 as "SHARED-STORAGE, COMPUTE-NODE."

Additionally, as shown in FIG. 4B, RUN-CMD-LINE primitive specification 420 further includes information such as Model Inputs 428, inputs utilized at deployment/ execution time—Run Inputs 430, and application characteristics—Characteristic Inputs 432. Model Inputs 428 lists the "Application bits," which is the name of the executable, the command line to run the executable, and the names of command line parameters. RUN-CMD-LINE primitive specification 420 lists Run Inputs 430 as "Command line parameters," and, in practice, would list the actual command line parameter values to be used at run time.

Further, RUN-CMD-LINE primitive specification 420 also lists the operating system and hardware configuration for running under Characteristic Inputs 432. RUN-CMD-LINE primitive specification 420 also includes a listing of implementations of the primitive on various clouds—Implementations 434 which lists the clouds (Amazon, Rackspace) under Cloud 436 on which the primitive has been implemented. As shown in FIG. 4B, Cloud 436 lists the cloud specific implementations of RUN-CMD-LINE primitive 420 for Amazon™ and Rackspace™ as Amazon RunCmd-Line and RackspaceRunCmdLine, respectively.

FIG. 4C shows an exemplary specification for the "SHARED-STORAGE" primitive 440 listed in Dependencies 406 in batch execution pattern primitive 400. "SHARED-STORAGE" primitive 440 includes information such as: name of the primitive—Name 442 ("Shared Storage"), a description of the primitive's function or utility—Description 444 ("Shared Storage"), version or revision number Version—445, any dependencies or interrelationships with other primitives—Dependencies 446 (None—i.e. no dependencies), inputs utilized at modeling time 448 (None), and inputs utilized at deployment/execution time—Run Inputs 450 (None).

Additionally, as shown in FIG. 4C, "SHARED-STORAGE" primitive 440 specification further includes information such as Characteristic Inputs 452, which can list the maximum and minimum storage (Max Storage, Min Storage) for the application. "SHARED-STORAGE" primitive 440 also includes a listing of implementations of the primitive on various clouds—Implementations 454 which lists the clouds (Amazon, Rackspace) under Cloud 456 on which the primitive has been implemented. As shown in FIG. 4C, Cloud 456 lists the cloud specific implementations of "SHARED-STORAGE" primitive 440 for Amazon and Rackspace as AmazonDFS and RackspaceSAN, respectively.

Figure 4D:
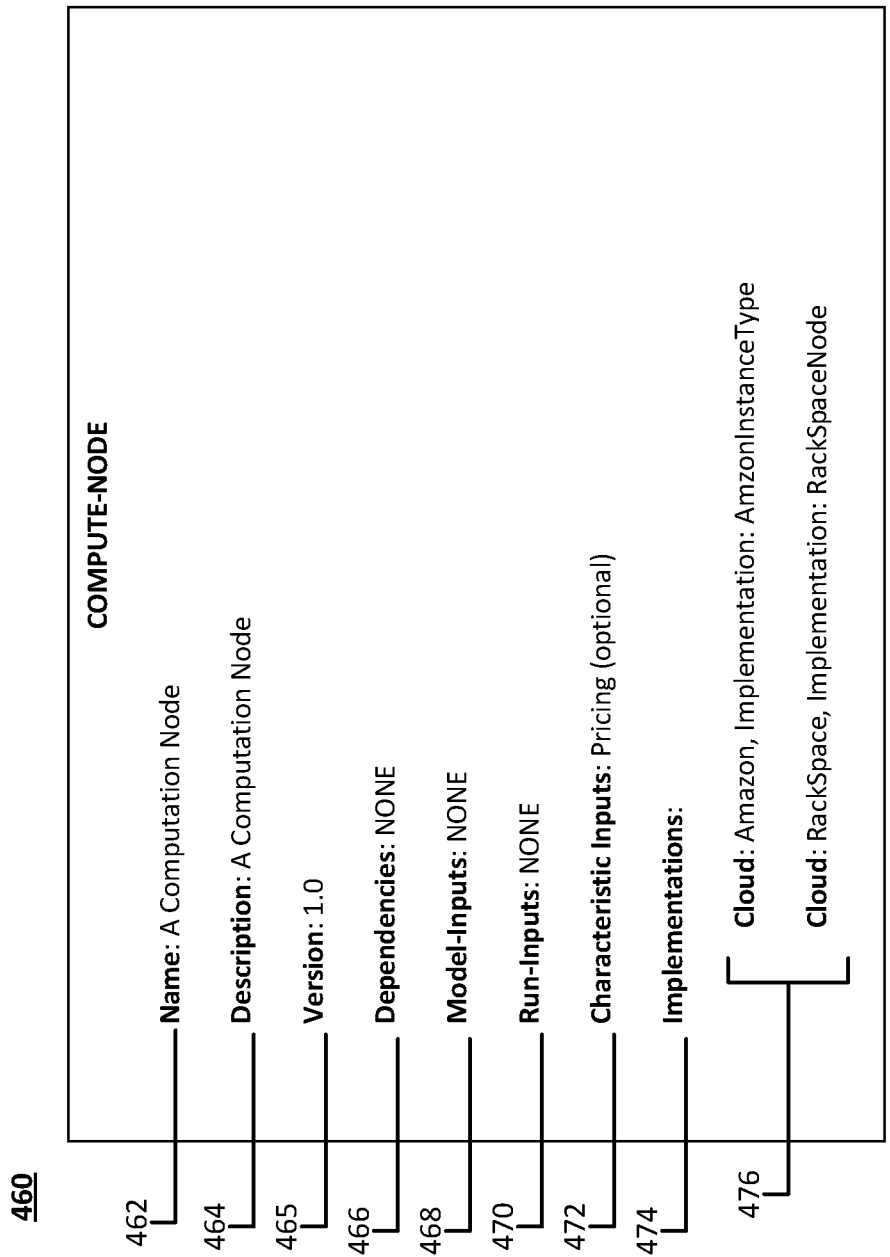
FIG. 4D shows an exemplary specification for the "COMPUTE-NODE" primitive.

FIG. 4D shows an exemplary specification for the "COMPUTE-NODE" primitive 460 listed in Dependencies 406 in batch execution pattern primitive 400. Like the other exemplary primitive specifications, COMPUTE-NODE primitive specification 460 includes information such as: name of the primitive—Name 462 ("A Computation Node"), a description of the primitive's function or utility—Description 464 ("A Computation Node"), version or revision number Version—465, any dependencies or interrelationships with other primitives—Dependencies 466 (None), and inputs utilized at modeling time 468 (None), and Run-Inputs 470 (None).

Additionally, as shown in FIG. 4D, COMPUTE-NODE primitive specification 460 further includes information on additional characteristics—Characteristic Inputs 472. COMPUTE-NODE primitive specification 460 can optionally list "Pricing" under Characteristic Inputs 472. When "Pricing" is specified under Characteristic Inputs 472, the application may be run on those clouds whose pricing model falls within the pricing constraints specified under "Pricing." COMPUTE-NODE primitive specification 460 also includes a listing of implementations of the primitive on various clouds—Implementations 474 which lists the clouds (Amazon™, Rackspace™) under Cloud 476 on which the primitive has been implemented. As shown in FIG. 4D, Cloud 476 lists the cloud specific implementations of COMPUTE-NODE primitive specification 460 for Amazon™ and Rackspace™ as Amazon InstanceType and RackspaceNode, respectively.

Figure 4E:
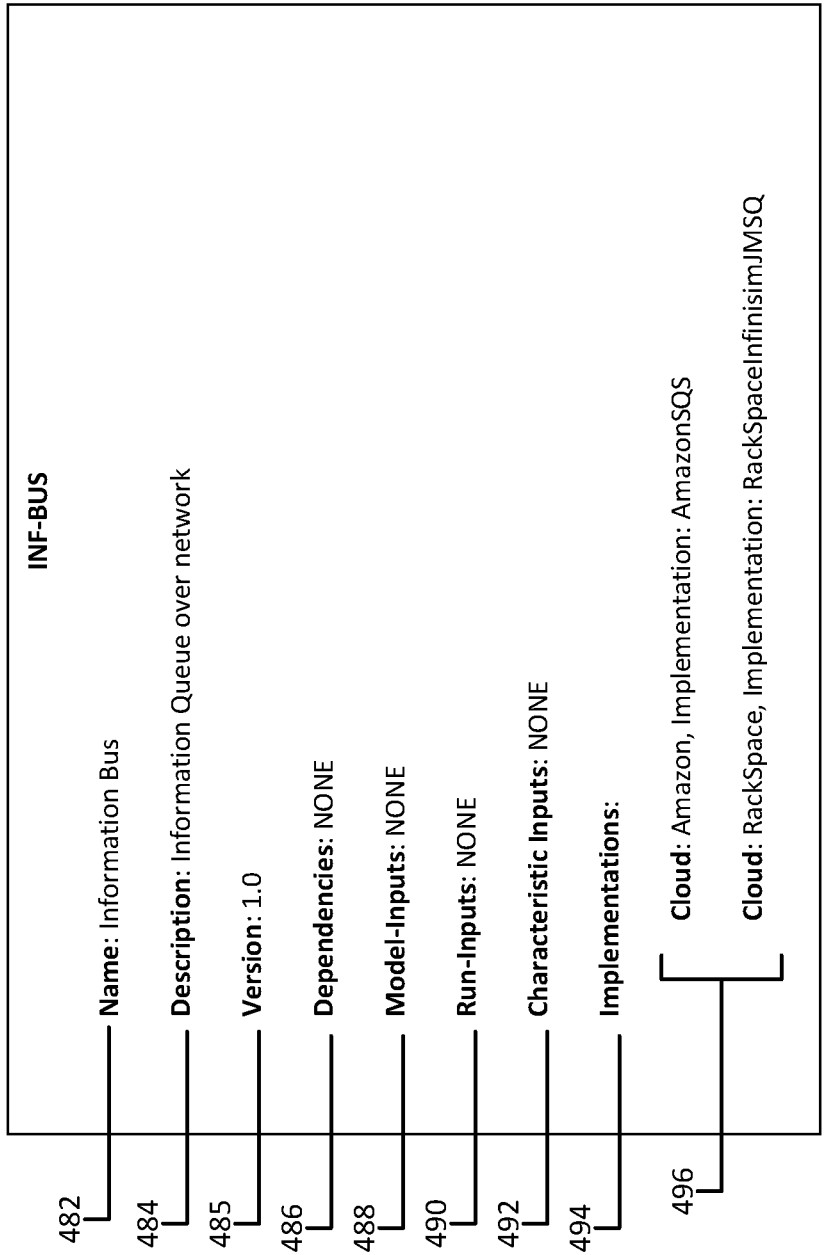
FIG. 4E shows an exemplary specification for the "INF-BUS".

FIG. 4E shows an exemplary specification for the "INF-BUS" primitive 480 listed in Dependencies 406 in batch execution pattern primitive 400. Like the other exemplary primitive specifications, INF-BUS primitive specification 480 includes information such as: name of the primitive—Name 482 ("Information Bus"), a description of the primitive's function or utility—Description 484 ("Information Queue over Network"), version or revision number Version—485, any dependencies or interrelationships with other primitives—Dependencies 486 (None), inputs utilized at modeling time Model Inputs 488 (None), Run Inputs 490 (None), and Characteristic Inputs 492 (None).

INF-BUS primitive specification 480 also includes a listing of implementations of the primitive on various clouds—Implementations 494 which lists the clouds (Amazon™, Rackspace™) under Cloud 496 on which the primitive has been implemented. As shown in FIG. 4E, Cloud 496 lists the cloud specific implementations of INF-BUS primitive specification 480 for Amazon™ and Rackspace™ as AmazonSQS and RackspaceInfinisim-JMSQ, respectively.

Based on available metadata descriptions of primitives exemplified by FIG. 4A-E, an application can be (a) modeled in terms of a high level primitive such as "Batch Execution" (FIG. 4A) using the model inputs and characteristics needed; and (b) deployed/executed on a cloud of choice using runtime inputs.

FIG. 5A shows a flowchart 500 of an exemplary algorithm to obtain inputs for the modeling of applications based on system and pattern primitives. As shown in FIG. 5A, in step 520, at the time an application is being modeled, the user may be queried for the pattern primitive (or a pattern built from one or more primitives) such as exemplary BATCH-EXECUTION primitive 400 discussed above. Next, in step 530, for a given pattern, the algorithm may query users for model inputs and characteristic inputs. In step 540, the algorithm determines if a given pattern has dependencies. If there are no dependencies, the modeling is complete. Otherwise (if there are dependencies), for given pattern, the algorithm iterates through steps 520 and 530 for each dependency pattern. Once application modeling is complete, then, in step 545, an infrastructure representation of the application may be generated and the application can be deploy-executed seamlessly.

Using the above algorithm, for an exemplary application "CompApp.exe," which is being batch executed using the exemplary BATCH-EXECUTION primitive discussed above, the following inputs may be provided at modeling time:
  i. Application Bits: "CompApp.exe",
  ii. Command Line: "% shared_store %/CompApp.exe—parameter1 value1—parameter2 value2 inputData"
  iii. Command Line Parameter Names: parameter1, parameter2, inputData
  iv. Application Characteristics:
    a. OS=Windows
    b. Hardware profile=x86, etc.
    c. Node Pricing (optional)
    d. Maximum Storage, Minimum Storage FIG. 5B shows a flowchart 550 of an exemplary algorithm to obtain inputs for the deployment and execution of applications using system and pattern primitives. At run time, in step 570, the user may select a pattern primitive (or a pattern built from primitives) such as exemplary BATCH-EXECUTION primitive 400 discussed above. Next, in step 580, for given pattern, system queries users for runtime inputs or may obtain these automatically from a file. In step 590, the algorithm determines if a given pattern has dependencies. If there are no dependencies, then, in step 595, the algorithm may query the user or automatically determine the cloud infrastructure on which the application is being deployed-executed. Otherwise, if the application has dependencies, for a given pattern, the system iterates through steps 570 and 580 for each dependency pattern.

Using the above algorithm, for the exemplary batch executed application "CompApp.exe," the following inputs will be provided at run time:
  i. Tasks
  ii. Number of Nodes—numNodes
  iii. parameter1 value
  iv. parameter2 value
  v. inputData
  vi. Infrastructure (Amazon, Rackspace, etc.)

Note that the primitives above are exemplary and for illustrative purposes only. In general, composite interfaces can be built based on these primitive patterns. In addition, "cluster synchronization operations" may be used to create "workflow templates" that capture the mechanics of a distributed computing pattern. Examples of cluster synchronization operations include, "Wait on Node," where a task on a node in a workflow can proceed after the immediately preceding task has completed on that node. Another example of a cluster synchronization operation is "Wait on Cluster," where task in a workflow can proceed after the immediately preceding task has completed on all nodes For example, for a parallel problem where: (i) data is split, (ii) followed by parallel computations in batch mode on "n" nodes, and (iii) followed by processing of results on a single node can be modeled using the pattern template below. The number in parentheses indicates the size of the cluster launched.

1. Launch Shared Storage
  2. Launch 1 node
  3. Parallel (1)—split data using 1 computation node into t tasks Wait On Cluster
  4. Launch n−1 nodes
  5. Parallel (n)—set up application on each worker node Wait On Node
  6. Batch (n)—batch execution of application on n nodes for t tasks Wait On Cluster
  7. Terminate n−1 nodes
  8. Parallel (1)—process results In step 1 above, shared storage is launched. A single node is launched next (step 2), which, in step 3, splits the data set in parallel so that it can be processed using "t" tasks. Further computational steps are delayed by synchronization operator "wait on cluster" until all the data has been split. Next, in step 4, n−1 nodes are launched and, in step 5, the application is set up in parallel on "n" worker nodes. The "wait on node" synchronization operator ensures that the batch execution of the application on any individual node will not take place until application setup for that node has completed. After batch execution of the application "t" tasks on "n" nodes (step 6) has completed, which is ensured by the synchronization operator "wait on cluster," then, in step 7, n−1 nodes are terminated. Finally, in step 8, the results are processed in parallel by one node.

Other patterns for which primitives may be derived include, but are not limited to, applications based on Message Passing Interface ("MPI"), Map-Reduce, and Stateless Three-Tier Web patterns. MPI applications are typically launched initially on one node in a cluster. The computation is then automatically distributed by the MPI platform, which launches independent computational processes on some specified number of nodes in the cluster. These independent computational processes (running on individual cluster nodes) synchronize state periodically using the platform interfaces. A pattern template for MPI may use launch nodes, RUN-CMD-LINE, SHARED STORAGE and INF-BUS primitives. An exemplary workflow template for MPI is shown below.

1. Launch Shared Storage
  2. Launch n nodes
  3. Parallel (1)—launch MPI command on only one node Wait On Cluster
  4. Terminate n nodes Model time input for the primitive may be an MPI platform such as OpenMPI. A cloud-specific implementation of the MPI primitive can set up the nodes, storage, and network resources on the MPI platform and execute MPI application commands.

Map-Reduce is a programming model for processing and generating large data sets. Users specify a map function that processes a key/value pair to generate a set of intermediate key/value pairs, and a reduce function that merges all intermediate values associated with the same intermediate key. A template based pattern for Map-Reduce may be derived by combining two batch execution primitives with a Wait On Cluster synchronization operation. The first batch execution is the Map part, while the second batch execution is the reduce part.

In some embodiments, the application model is specified in terms of pattern and system primitives. In some embodiments, pattern and/or system primitives may be combined to build higher-level primitives termed composite interfaces, which may facilitate application modeling for more complex applications. Composite interfaces may be built using basic primitives as building blocks.

For example, web applications are typically designed to be stateless three-tier web applications. The three tiers are the application or application stack, the application container (or the server) and the database. A higher-level composite interface for the three-tier stateless pattern may comprise three primitives for the three tiers. Because the applications are stateless, they can be distributed simply by adding more instances of the same application stack to an existing cluster with the same database tier. Although various three-tier application stacks exist today such as Java™ Applications over well known containers such as JBoss, Apache Tomcat, and Ruby over Rails applications, the underlying distributed paradigm is the same. Therefore, a three-tier stateless web-application primitive can be derived. Model time inputs for the primitive may include the specific application stack technologies and the application bits.

In some embodiments, at deployment time, the system may invoke execute methods corresponding to a composite interface's implementation for a specific cloud on which the deployment is taking place. Because composite interfaces can be built using system and pattern primitives, the implementation for a composite interface can also result in the invocation of execute methods that implement the underlying system and pattern primitives (which have been used to build the composite interface) for the cloud on which the application is being deployed. In addition, in some embodiments, the deployment system may also interact directly with the cloud provider's APIs to achieve deployment.

If the application model is specified using a workflow template, then the deployment system follows the semantics of the workflow for that template. Steps in the workflow template may be executed, and upon completion of a step, the workflow may proceed to the next step either in a cluster-wide fashion or a node-wise fashion depending on the cluster synchronization operation between the steps. In some embodiments, the deployment system may maintain a workflow state in memory to facilitate deployment. The workflow state may include information such as the size of the cluster, list of current nodes in the cluster, current task status on individual nodes, etc.

In some embodiments, an execution engine may perform the function of using the infrastructure independent representation to deploy and execute applications on a specified cluster. In one embodiment, the following algorithm may be used to deploy/execute the application on a cluster.

1) The execution engine may start with an infrastructure independent representation of the application.
2) If the infrastructure independent representation includes composite interfaces, then the engine may invoke execute methods corresponding to a composite interface's implementation for a specific cloud on which the deployment is taking place.
   a. If the composite interface's implementation, in turn, uses additional interfaces, system, or pattern primitives, then the execution engine may be called recursively to deploy these components.
   b. Deployment may involve direct interaction with the cloud provider's APIs.
3) If the application model is a template, then the execution engine follows the semantics of the workflow for that template, which can include:
   a. Calling the engine recursively or each step in the workflow
   b. Using the cluster synchronization operations to determine whether to move to the subsequent step in the workflow in a cluster-wide or node-wise fashion.

Figure 6:
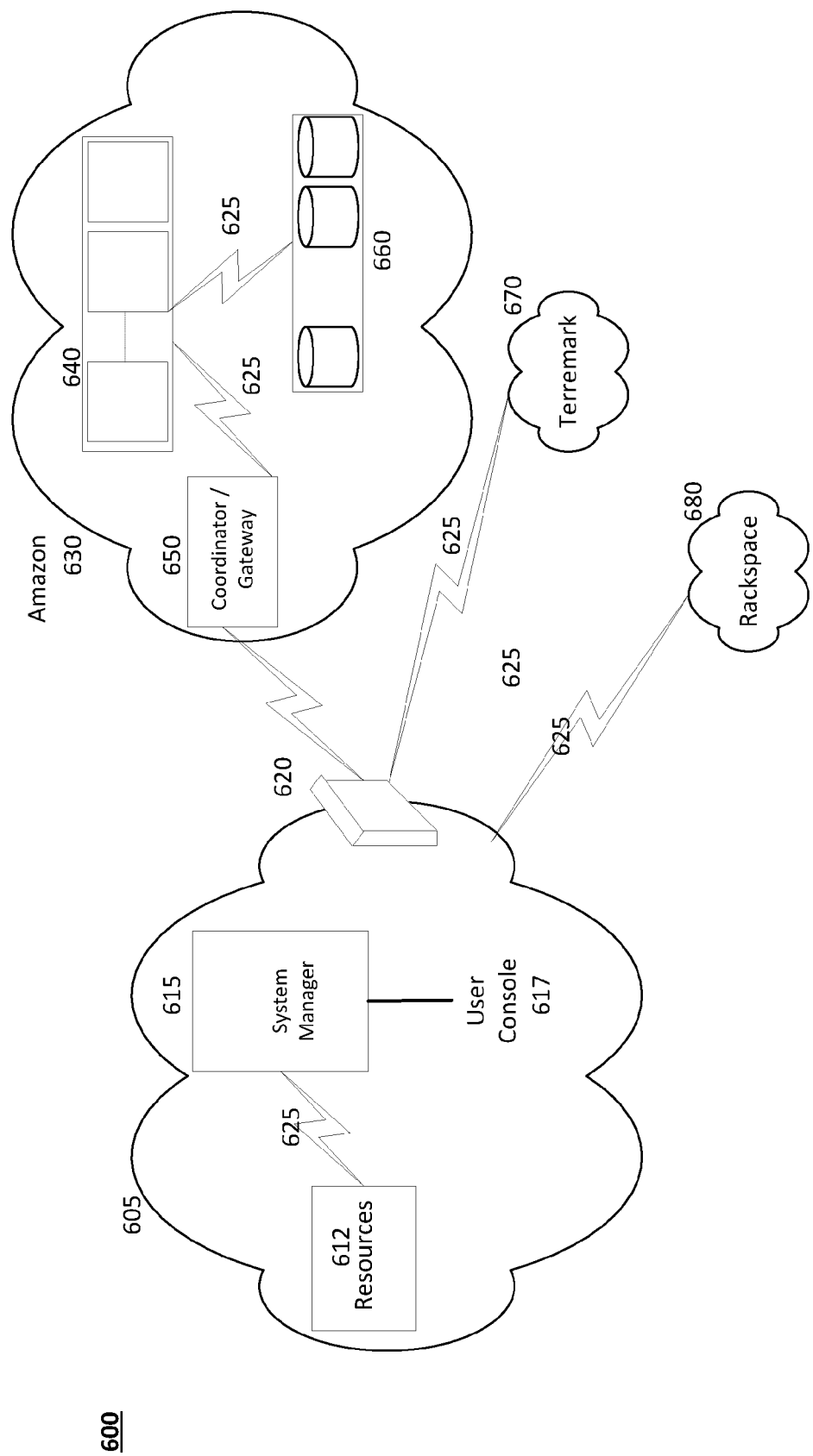
FIG. 6 shows an exemplary architecture of a system consistent with disclosed embodiments for deploying and/or migrating applications to distributed systems including clouds.

FIG. 6 shows an exemplary architecture of a system consistent with disclosed embodiments for deploying and/or migrating applications to distributed systems including clouds. As shown in FIG. 2, system 600 includes System Manager 615, Coordinator/Gateway 650, security/firewall 620, and secure communication interlinks 625.

In some embodiments, system manager 615 may be deployed on a cloud infrastructure, which may be private or public cloud 605. As shown in FIG. 2, resource 612 in cloud 605 represents the hardware and software that underlies cloud 605. For example, resource 612 may include hardware such as servers, computers, storage, and software such as operating systems, platforms, application servers, applications, etc. For example, resource 612 may facilitate the hosting of distributed computing applications to be modeled and deployed. Resource 612 may also facilitate the hosting of data for the distributed computing application to be modeled and deployed and store the results obtained after running the distributed computing application. Data and communications between Resource 612 and System Manager 615 may occur over secure communication interlinks 625.

In some embodiments, system manager 615 may facilitate the modeling and deployment of distributed computing applications on one or more cloud infrastructures, such as exemplary Amazon™ cloud infrastructure 630, Terremark™ 670, and/or Rackspace™ 680. For example, system manager 615 may provide APIs for managing templates and modeling new applications. In one embodiment, system manager 615 may provide User Console 617 to allow users to model distributed computing applications for deployment and may also be used to provide run time inputs for deploying applications. For example, a program implementing exemplary algorithm 500 shown in FIG. 5A may be invoked on User Console 617 to obtain inputs for modeling.

In some embodiments, coordinator/gateway 650 orchestrates the deployment and execution of distributed computing application for a cloud. In some embodiments, each cloud (Amazon cloud 630, Terremark cloud 670, and Rackspace 680) may include a distinct coordinator/gateway 650. Coordinator/gateway 650 and system manager 615 may communicate with each other over the network using secure communication interlinks 625. In one embodiment, system manager 615 and coordinator/gateway 650 may communicate with each other over the using Representational State Transfer ("REST") compliant, or RESTful web service calls.

In some embodiments, when an application needs to be deploy-executed on a cloud, the infrastructure independent application model may be passed to the gateway for that cloud as an input. In the description below, for ease of explanation, the cloud is assumed to be the Amazon™ cloud infrastructure 630. However, the concepts discussed are not limited to any specific cloud infrastructure and may be applied to any cloud infrastructure with appropriate modifications as would be apparent to one of ordinary skill in the art. For example, system manager 615 may pass the infrastructure independent application model to coordinator/gateway 650 for Amazon™ cloud infrastructure 630.

As shown in FIG. 6, Amazon™ cloud infrastructure 630 includes virtual machine nodes 640 and shared storage 660, which may be encrypted. In some embodiments, coordinator/gateway 650 may also run on one or more virtual machine nodes. The exchange of data between virtual node 640 and shared storage 660 can occur over secure communication interlinks 625. In some embodiments, coordinator/gateway 650 maintains a library of implementations for primitives and composite interfaces for Amazon™ cloud 630. When an application is to be deployed, coordinator/gateway 650 can use the library to perform deployment and execution tasks for Amazon™ cloud 630. Accordingly, the launching of a shared storage implementation will set up a DFS on Amazon™ cloud 630, while launching the shared storage implementation on Terremark™ cloud 670 will set up NAS/SAN. In some embodiments, coordinator/gateway 650 may launch agents, which can be deployed on application cluster nodes, to monitor and report task status back to coordinator/gateway 650.

In some embodiments, system manager 615 may perform the following steps while deploying an application after obtaining appropriate run-time inputs either directly from the user or by using other automated mechanisms to obtain the inputs. For example, when run-time inputs are obtained from the user, algorithm 550 may be invoked to obtain the appropriate run-time inputs through user console 617. In some embodiments, system manager 615 may select one of clouds 630, 670, or 680 for deployment. For example, for the batch execution pattern example above, system manager 615 may determine that there is no existing implementation for Batch-Execution pattern for Terremark™ cloud 670. Therefore, system manager 615 may rule out Terremark™ as a possible execution cloud.

System manager 615 may then select Amazon™ cloud 630 and may then provide coordinator/gateway 650 for Amazon™ cloud 630 with all model-time and run-time inputs for that application and job. Since this is a primitive abstract, the execute method corresponding to the implementation for Amazon™ cloud 630 will be called along with the user provided model-time and run-time inputs. Accordingly, coordinator/gateway 650 may select AmazonBatchExecution as the Amazon™ implementation for the batch execution pattern of computing based on information in batch execution pattern primitive specification 400, which lists the specific execute method for Amazon™ (under Clouds 416 in batch execution pattern primitive specification 400) as AmazonBatchExecution.

Note that batch execution pattern primitive specification 400 also lists "SHARED-STORAGE" primitive 440 and "INF-BUS" primitive 480 as dependencies 406. Therefore, in some embodiments, the implementation code AmazonBatchExecution may request the implementation of these primitives from coordinator/gateway 650. Coordinator/gateway 650 may then provide AmazonDFS and AmazonSQS as the implementations of "SHARED-STORAGE" primitive 440 and "INF-BUS" primitive 480, respectively, to AmazonBatchExecution.

AmazonBatchExecution may then execute methods associated with AmazonDFS and AmazonSQS to setup the shared storage and the information bus. For example, various well-known distributed systems technologies may be used to create shared storage as a distributed file system. In one embodiment, commercially available systems such as SectorFS, GlusterFS, etc. may be used. In general, the execute method associated with AmazonDFS will include logic for how to bring up and run an appropriate distributed file system on Amazon™ Similarly, execute methods associated with AmazonSQS may bring up Amazon Shared Queue Service, which provides a Queue for producing and consuming messages.

After the AmazonDFS and AmazonSQS methods have completed, AmazonBatchExecution may launch the appropriate number compute nodes as specified by Number of Nodes (numNodes) run time input. COMPUTE-NODE primitive specification 460 lists the cloud specific implementations of COMPUTE-NODE primitive specification 460 for Amazon™ as AmazonInstanceType. Accordingly, for the example above, the execute method associated with AmazonInstanceType may be used to launch the nodes. In some embodiments, AmazonBatchExecution may also launch agents on the individual nodes. The agents may monitor and report task status back to coordinator/gateway 650 and perform other tasks as directed.

In some embodiments, AmazonBatchExecution may also place numTasks units of compute tasks on the information bus, which may be Amazon™ Shared Queue Service, to synchronize batch execution. In some embodiments, AmazonBatchExecution running on coordinator/gateway 650 may request the agents on compute nodes to pick up compute tasks from the Amazon™ Shared Queue service and run them as per the RUN-CMD-LINE pattern primitive 420, which specifies AmazonRunCmdLine as the Amazon implementation. Accordingly, AmazonRunCmdLine may be invoked using the appropriate run time inputs. For example, in one instance, AmazonRunCmdLine may simply open a command shell and call the virtual machine node OS to execute the command as specified in the command line.

Note that although the description above uses exemplary cloud infrastructures to describe possible implementations, alternate implementations are envisaged and the methods described could be extended to other cloud infrastructures as would be apparent to one of ordinary skill in the art. Further, although primitives, composite interfaces, and templates have been described as exemplary intermediate infrastructure independent representations, other infrastructure independent intermediate representational schemes may also be used. In some embodiments, software to facilitate conducting the processes described above can be recorded on computer-readable media or computer-readable memory. These include, but are not limited to, hard drives, solid state drives, optical media, removable media, and the like.

Other embodiments of the present invention will be apparent to those skilled in the art from consideration of the specification and practice of one or more embodiments of the invention disclosed herein. It is intended that the specification and examples be considered as exemplary only, with a true scope and spirit of the invention being indicated by the following claims.

What is claimed is:

1. A processor-implemented method comprising:
obtaining, based, in part, on system and pattern constructs associated with an application, a cloud infrastructure independent representation of the application, wherein the cloud infrastructure independent representation comprises a representation of an underlying pattern of resource utilization of the application, wherein the underlying pattern of resource utilization of the application is not cloud-specific, and wherein the application is part of a class of applications comprising one of: master-slave applications, or map-reduce applications, or multi-tier applications; and
deploying the application on one or more cloud infrastructures, based, in part, on the cloud infrastructure independent representation of the application by:
obtaining, for each of the one or more cloud infrastructures on which the application is deployed, a corresponding cloud-specific implementation of the application, wherein each corresponding cloud-specific implementation is obtained from the cloud independent representation of the application; and
initiating execution, on the one or more cloud infrastructures, the corresponding cloud-specific implementations of the application.

2. The processor-implemented method of claim 1, wherein the cloud infrastructure independent representation further comprises:
   a representation of execution patterns for application tasks.

3. The processor-implemented method of claim 1, wherein the cloud infrastructure representation further comprises:
   composite interfaces comprising one or more of:
   scripts or Application Programming Interfaces (APIs).

4. The processor-implemented method of claim 1, wherein the class of applications further comprises: Message Passing Interface (MPI) applications, or stateless applications.

5. The processor-implemented method of claim 1, wherein the underlying pattern of resource utilization comprises a representation of one or more of: storage resources, memory resources, and network resources utilized by the application.

6. The processor-implemented method of claim 5, wherein prior to deploying the application on the one or more cloud infrastructures, the method comprises:
   selecting the one or more cloud infrastructures on which the application is to be deployed based, in part, on the availability, on the one or more cloud infrastructures, of specified characteristics in the cloud infrastructure representation of one or more of the storage resources, the memory resources, the network resources, or security settings utilized by the application.

7. The processor-implemented method of claim 5, wherein the representation of the storage resources comprises a machine readable specification of storage filesystem characteristics.

8. The processor-implemented method of claim 7, wherein the specification of storage filesystem characteristics describe one or more of: a Network File System ("NFS") over NAS/SAN, or a Cluster File System, or a Distributed File System ("DFS").

9. The processor-implemented method of claim 5, wherein the representation of the storage resources utilized by the application further comprises a specification of one or more of: security parameters, high-availability parameters, performance parameters, or redundancy constraints.

10. A system comprising:
    a memory to store system and pattern constructs associated with an application; and
    at least one processor coupled to the memory, wherein the processor is configured to:
      obtain, based, in part, on the system and pattern constructs associated with the application, a cloud infrastructure independent representation of the application, wherein the cloud infrastructure independent representation comprises a representation of an underlying pattern of resource utilization of the application, wherein the underlying pattern of resource utilization of the application is not cloud-specific, and wherein the application is part of a class of applications comprising one of: master-slave applications, or map-reduce applications, or multi-tier applications; and
      deploy the application on one or more cloud infrastructures, based, in part, on the cloud infrastructure independent representation of the application by:
        obtaining, for each of the one or more cloud infrastructures on which the application is deployed, a corresponding cloud-specific implementation of the application, wherein each corresponding cloud-specific implementation is obtained from the cloud independent representation of the application; and
        initiating execution, on the one or more cloud infrastructures, the corresponding cloud-specific implementations of the application.

11. The system of claim 10, wherein the cloud infrastructure independent representation further comprises:
    a representation of execution patterns for application tasks.

12. The system of claim 10, wherein the cloud infrastructure representation further comprises:
    composite interfaces comprising one or more of:
    scripts or Application Programming Interfaces (APIs).

13. The system of claim 10, wherein the class of applications further comprises: Message Passing Interface (MPI) applications, or stateless applications.

14. The system of claim 10, wherein the underlying pattern of resource utilization comprises a representation of one or more of: storage resources, memory resources, and network resources utilized by the application.

15. The system of claim 14, wherein prior to deploying the application on the one or more cloud infrastructures, the method comprises:
    selecting the one or more cloud infrastructures on which the application is to be deployed based, in part, on the availability, on the one or more cloud infrastructures, of specified characteristics in the cloud infrastructure representation of one or more of the storage resources, the memory resources, the network resources, or security settings utilized by the application.

16. The system of claim 14, wherein the representation of the storage resources comprises a machine readable specification of storage filesystem characteristics.

17. The system of claim 16, wherein the specification of storage filesystem characteristics describe one or more of: a Network File System ("NFS") over NAS/SAN, or a Cluster File System, or a Distributed File System ("DFS").

18. The system of claim 14, wherein the representation of storage resources utilized by the application further comprises a specification of one or more of: security parameters, high-availability parameters, performance parameters, or redundancy constraints.

19. A non-transitory computer-readable medium comprising instructions, which when executed by a processor, perform steps in a method comprising:
    obtaining, based, in part, on system and pattern constructs associated with an application, a cloud infrastructure independent representation of the application, wherein the cloud infrastructure independent representation comprises a representation of an underlying pattern of resource utilization of the application, wherein the underlying pattern of resource utilization of the application is not cloud-specific, and wherein the application is part of a class of applications comprising one of: master-slave applications, or map-reduce applications, or multi-tier applications; and
    deploying the application on one or more cloud infrastructures, based, in part, on the cloud infrastructure independent representation of the application by:
    obtaining, for each of the one or more cloud infrastructures on which the application is deployed, a corresponding cloud-specific implementation of the application, wherein each corresponding cloud-specific implementation is obtained from the cloud independent representation of the application; and initiating execution, on the one or more cloud infrastructures, the corresponding cloud-specific implementations of the application.

20. The computer-readable medium of claim 19, wherein the cloud infrastructure independent representation further comprises:
   a representation of execution patterns for application tasks.

21. The computer-readable medium of claim 19, wherein the cloud infrastructure representation further comprises:
   composite interfaces comprising one or more of:
   scripts or Application Programming Interfaces (APIs).

22. The computer-readable medium of claim 19, wherein the class of applications further comprises: Message Passing Interface (MPI) applications, or stateless applications.

23. The computer-readable medium of claim 19, wherein the underlying pattern of resource utilization comprises a representation of one or more of: storage resources, memory resources, and network resources utilized by the application.

24. The computer-readable medium of claim 23, wherein prior to deploying the application on one or more cloud infrastructures, the method comprises:
   selecting the one or more cloud infrastructures on which the application is to be deployed based, in part, on the availability, on the one or more cloud infrastructures, of specified characteristics in the cloud infrastructure representation of one or more of the storage resources, the memory resources, the network resources, or security settings utilized by the application.

* * * * *